United States Patent Office 3,785,923
Patented Jan. 15, 1974

3,785,923
COMBINED EMERGENCY SWITCH-OFF AND CONTROL ROD DRIVE FOR CONTROL ROD OF A GAS-COOLED NUCLEAR REACTOR
Tihomir Bratoljic, Wettingen, and Josef Waldis and Max Zimmermann, Untersiggenthal, Switzerland, assignors to Aktiengesellschaft Brown, Boveri & Cie, Baden, Switzerland
Filed Mar. 22, 1971, Ser. No. 126,495
Claims priority, application Switzerland, Mar. 25, 1970, 4,485/70
Int. Cl. G21c 7/14
U.S. Cl. 176—36 R       3 Claims

ABSTRACT OF THE DISCLOSURE

A combined emergency switch-off and control rod drive for a control rod of a gas-cooled nuclear reactor includes an electrical motor coupled through a clutch to a cable winch on which is wound a cable connected to the control rod for lowering rod into the reactor core. One brake of the eddy current type, is provided for controlled braking of the cable and a second, locking brake is provided for purposes of emergency, this locking brake being actuated in accordance with the response of a cable monitoring device which is arranged to detect both a relief of the cable as well as an overload thereon.

---

This invention relates to a device for the operation of a combined control and emergency switchoff rod drive for a control rod arranged in a gas-cooled nuclear reactor, utilizing a drive of the cable winch type, and which is equipped with a permanent magnet eddy current brake operating with short-circuitable magnetic flux, the intensity of the magnetic flux being adjustable dependent on the fall movement of the control rod into the reactor core.

For the control of nuclear reaction there are generally used, in the case of gas-cooled nuclear reactors, control rods which penetrate into the core of the reactor in vertical arrangement. Such control rods must meet the requirement, on the one hand, of being constantly ready for control and, on the other hand, in the case of danger, to insure a rapid switching off of the reaction, the short permissible switchoff time giving rise to serious problems.

Cable winch drives are known where the control rods or emergency switchoff rods can be lowered into the nuclear reactor under the influence of a permanent magnet eddy current brake with short-circuited magnetic flux and with intensity regulation of the magnetic flux as a function of the fall movement of the control rod.

A disadvantage of the known cable winch drives resides in that the forces occurring due to the acceleration are absorbed by the cable without control of cable safety. Further, no attention is given to a possible disurbance upon introduction of the control rod around the reactor core.

These disadvantages are particularly evident due to modern developments of gas-cooled and graphite-moderated nuclear reactors, since by the volume and cross-section variations at the moderator block, also the control rod canals are affected.

It is a principal objective of the present invention, therefore, to avoid the above-mentioned disadvantages in control rod drives and to carry out a satisfactory regulation of the reactor core constantly, sufficient safety being assured for the control of the power plant installation.

The invention serving to solve the problem is characterized by a cable monitor coupled with the cable winch drive and with the eddy current brake and connected with a locking brake, which monitor indicates the load of the cable in any controlled and end position, and upon relief of load or overload transmits a signal for at least partial stopping of the cable winch drive.

A special embodiment in accordance with the object of the invention is characterized in that the cable monitor is constituted by a cable roll arranged at a pivot lever provided with response points, which cable roll is coupled via a control lever with a locking brake which supports the eddy current brake.

By the arrangement according to the invention, besides the advantage of continuous monitoring of the fall movement of the emergency switchoff and/or control rod, a greater functional safety of the drive is achieved, which becomes effective in particular when there is danger of a control rod jamming in the moderator block. Another advantage of the combined control and emergency switch-off rod drive results from the use of the locking brake, since this renders unnecessary a locking of the rod in the end position. It is thus evident that the present design is simpler in technical as well as economic respects.

An example of construction in accordance with the object of the invention is shown in the accompanying drawings, in which.

Figure 1:
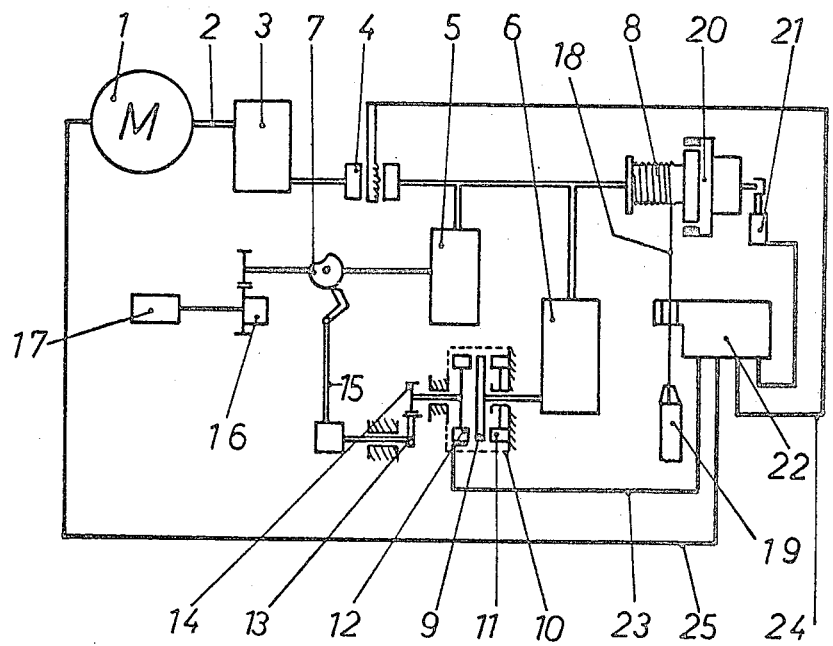
FIG. 1 is a diagrammatic representation of the construction of the combined control-and-emergency-switchoff rod drive.

In FIG. 1, the parts of the combined emergency-switchoff-and-control rod drive are represented symbolically. A drive motor 1 is connected via a transmission 2 with and drives an intermediate gearing 3, to the output shaft of which is connected the input of an electromagnetic clutch 4. To the driven output shaft of clutch 4 are connected to a step-down gearing 5, a step-up gearing 6, and the cable drum 8. The output shaft of the step-down gearing 5 is connected with a cam plate 7 and sets it into rotation.

The output shaft of step-up gearing 6 drives a rotary disk 9 of an eddy current brake 10, which is so designed that its magnetic flux intensity can be adjusted as desired. This is achieved by the use of relatively rotatable pole crosses 11 and 12. The displacement of the loose pole cross 12 is brought about by a toothed gear segment 13 which meshes with a setting pinion 14 secured to a rotary shaft which mounts the pole cross 12, angular displacement of the tooth segment 13 being controlled by a feeler type of sensor 15 which picks up the movement at cam plate 7 by following the surface of the latter.

Mounted on the same shaft with cam plate 7 is a gear drive to transmitter 16, which in simple manner, e.g. by electric means, transmits rotary movement of cam plate 7 to a position indicator 17 for the control rod 19.

Wound on drum 8 is the cable 18, which is connected to the upper end of control rod 19. Drum 8 has flanged to it a locking brake 20, whose brake lever system 21 is connected with a cable monitor 22. Further operative connections 23, 24, 25 of the cable monitor 22 exist with respect to the eddy current brake 10, the clutch 4, and the motor 1; these may be either hydraulic, mechanical or electrical.

Figure 2:
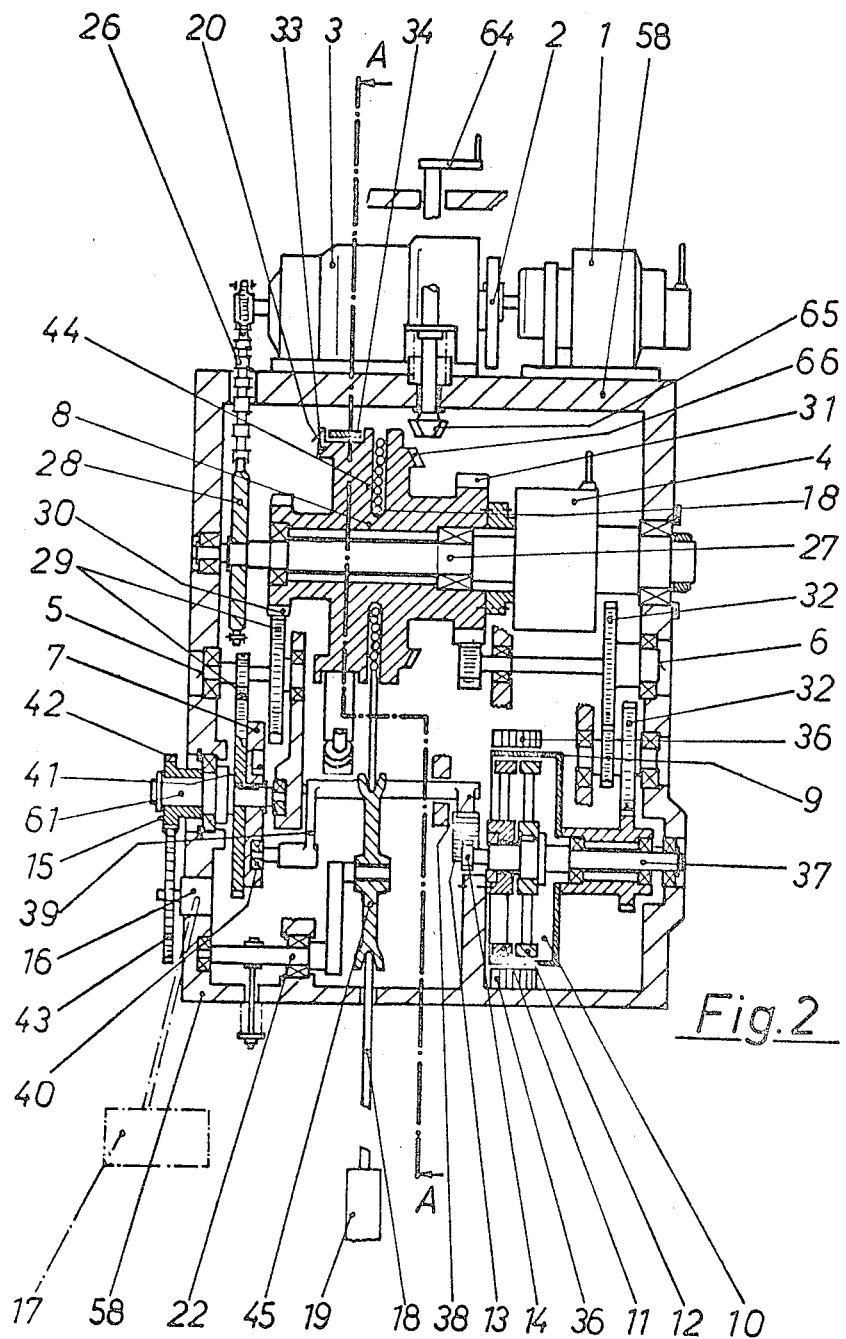
FIG. 2 is a sectional view illustrating a simplified representation of the cable winch drive.
Figure 3:
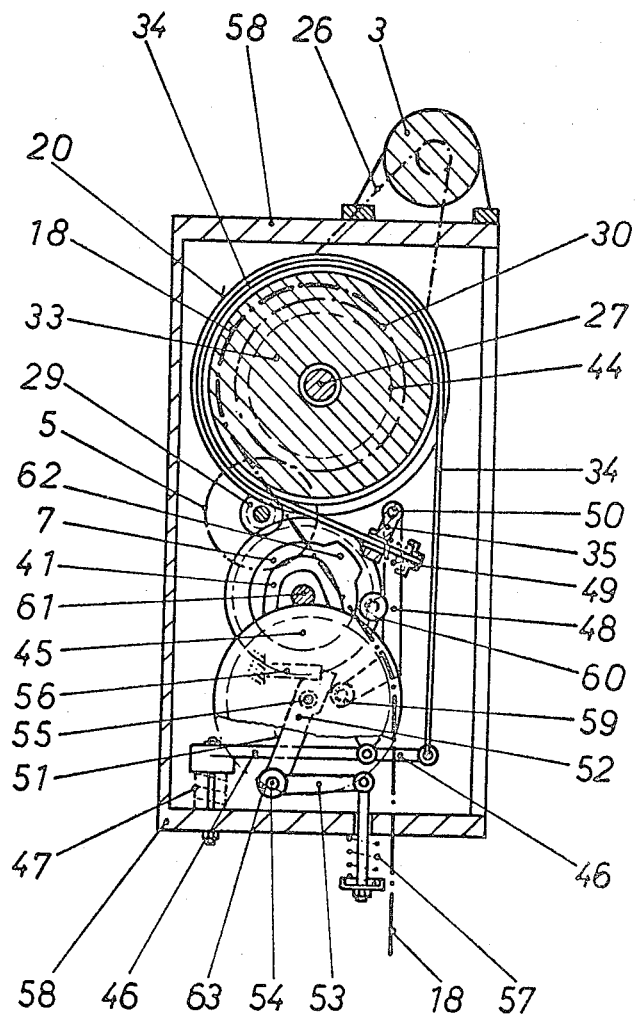
FIG. 3 is a section along line A—A according to FIG. 2.

Corresponding parts are marked in FIGS. 2 and 3 with the same reference symbols as in FIG. 1. In FIGS. 2 and 3, simple machine elements, such as wedges, screws, pins and in part bearings, have been omitted, since they are not essential to a clear understanding of the invention.

The diagrammatic representation of the invention depicted in FIG. 1 is shown in its structural design in FIG. 2 in section.

Motor 1 is connected with the intermediate gearing 3 via the transmission 2, which is here formed by a chain drive. Another chain drive 26 drives via the sprocket wheel 28 the part of the electromagnetic clutch 4 which is fixed on shaft 27.

The cable drum 8 is mounted loosely on shaft 27 and is firmly connected electromagnetically with clutch 4 upon actuation of the motor 1. The step-down gearing 5 is formed by a gear train 29 which sets the cam plate 7 into rotation, the drive occurring by means of a gear ring 30 flanged to drum 8.

Drum 8 includes an additional gear rim 31, which meshes with a train of spur gears 32 forming the step-up gearing 6 which drives disk 9 of the eddy current brake 10.

A brake disk 33 for the locking brake 20 is likewise rigidly connected with drum 8 and is designed as a band brake as shown. The brake band 34 is fastened to the brake lever system 21, which is shown in the drawings only by indication.

The eddy current brake 10 consists of the housing 35, the disk 9 rotatably mounted on shaft 37 and driven by the step-up gearing 6, the loose pole cross 12 integral with shaft 37, the fixed pole cross 11, and the setting pinion 14.

The setting pinion 14 is in meshed engagement with the toothed gear segment fastened to crank arm 38, arm 38 being mounted at a pivot point and being controlled in its movement by cam plate 7 through another crank arm 39 and a roll 40 secured thereto.

Cam plate 7, driven by the step-down gearing 5, comprises for the uptake of roll 40 an annular groove 41, whose curvature is such that crank arms 38 and 39 impart the displacement path to the loose pole cross 12.

On the same driven shaft 61 on which cam plate 7 is mounted there is provided a gearing 42, which transmits to the transmitter 16 via the spur wheel 43 designed as sensor 15 the particular position of the control rod 19. As already described in FIG. 1, transmitter 16 is connected with a position indicating instrument 17, which may, for example, be simply a voltmeter.

Drum 8 is designed in such a way that when the control rod 19 is raised, cable loop overlies cable loop in the winding groove 44. For the conduction of the cable a cable monitor 22 is made use of, which is formed by the cable roll 45 and a brake lever system 21 with pretensioned springs. As this brake lever system cannot be clearly shown in FIG. 2, it is described in greater detail in the following FIG. 3.

This view shows a section taken along line A—A through the example of construction of the invention according to FIG. 2 with the cable drum 8 rotatably mounted on shaft 27. Drum 8 has flanged to it the brake disk 33, and the brake band 34 is applied in a loop.

On one end, the brake band 34 is connected with one lever arm of brake lever 46, whose other arm rests against housing 58 through spring 47. The other end of brake band 34 is fastened to the short brake lever 35 over a pretensioned spring 49. The short brake lever 35 is rigidly connected with the feeler arm 48; they are jointly pivotable about the pivot point 50.

The cable roll 45 which guides cable 18 as it unwinds from drum 8 is fastened to the double arm crank lever 51, whose two arms 52 and 53 are movably mounted jointly at pivot point 54 in an eye 63.

Lever arm 52 is supported with a pretension spring 57 against housing 58 and causes continuous contact of the cable roll 45 with cable 18. Lever arm 52 carries the cable roll 45 on a stub shaft 55 and is limited in its movement in one pivoting direction by a fixed stop 56. In the other pivoting direction lever arm 52 is guided by the applying roll 59. This roll is mounted at the outer end of the feeler arm 48.

Still another roll 60 is provided at the feeler arm 48, which rolls off on cam 62. This cam 62 is disposed at the outer circumference of cam plate 7 and is set into rotation by the driven shaft 61 of the step-down gearing 5.

The mode of operation of the arrangement according to the invention will now be described in greater detail.

The reactor is controlled with control rods which are introduced into the core of the reactor from the top and, in emergencies, can fall in by their dead weight. Under control operation, motor 1 is set in operation and drum 8 is set into rotation by coupling with clutch 4. The magnets of the eddy current brake, which are constructed cross-shaped and in two parts, are in this case in a position such that a magnetic short-circuit occurs; hence no eddy current field can form over the housing 36 designed as an iron ring. Thereby also a brake action of the eddy current brake is avoided. In the intended control position, the brake of the stop motor is brought into action and retains the control rod in its intended position. Now if during the control operation a disturbance occurs, which manifests itself either by relief of cable 18 or by overload thereof, then, in the first case, the motor 1 is stopped via the brake lever system 21; in the second case, i.e. overload, the magnetic clutch 4 is disengaged and motor 1 is stopped. In both cases, the locking brake 20 is operated, so that further rotation or an unwinding of the cable is rendered impossible.

Relief of the cable may be due either to rupture of the cable or to the control rod getting stuck in a control rod canal of the moderator block. In both cases arm 52 of the crank lever 51 is pressed against roll 59 and by the feeler arm 48, the short brake lever 35 is set in motion, so that the brake disk 33 of the locking brake 20 is braked.

If, however, the control rod is introduced so far that it reaches the absolute position in the reactor core, cam 62 in connection with roll 60 at the feeler arm 48 triggers a similar brake movement, so that the control rod 19 cannot overrun its end position in the reactor core. In the event of danger, the current supply to the control rod drive is completely cut off, so that the motor 1 is stopped absolutely. By the current interruption at the same time the electromagnetic clutch 4 is disengaged and hence entrainment of the intermediate gearing 3 and of the sprocket wheel of the chain transmission to the motor 1 is precluded. Upon so-called "scram release," however, the cable monitor 22 and the eddy current brake remain connected with the cable drum. The pole crosses of the eddy current brake 10 are so connected in the starting position that the magnetic flux is short-circuited. It is thereby achieved that in the upper part of the stroke the control rod 19 can fall into the core practically unbraked. However, before the end position is reached, the speed of the control rod must be reduced, as an unbraked fall would cause damage. For this reason, at half stroke the displacement movement is imparted to the loose pole cross 12 by the cam plate 7 via the setting pinion 14, crank arms 38, 39 and the toothed gear segment 13, so that the pole crosses of the loose pole cross 12 are rotated 90°. Thereby the full magnetic flux intensity is supplied to the eddy current brake and it can now furnish full braking torque. To obtain a sufficient brake torque, the step-up gearing 6 is provided, which sets disk 9 in rotation at a multiple of the speed of the cable drum 8.

The step-down gearing 5, which drives cam plate 7, is so designed that this cam plate makes one complete revolution during the control rod stroke. The control rod 19, braked by the eddy current brake, is stopped just before it reaches its lowest end position, by actuation of the locking brake 20. In analogy to the preceding description this is effected by the cam 62 provided on the cam plate which actuate the brake levers of the band brake. To regulate and limit the brake force, pretensioned springs are arranged at both band ends.

The position of the control rod in the reactor core is to be indicated on a switch panel of the control room of the nuclear power plant. The telecommunication system is based on the sensor 15 transmitting a pulse to the transmitter 16, which releases a corresponding pulse in the position indicator 17. This can be done in simple manner by a voltmeter which indicates the voltage of the particular position.

If, in the so-called "scram" case, a disturbance occurs, then, as in the above described normal control connection the brake lever system 21 is actuated and the control rod or respectively the emergency switchoff rod if the invention is applied thereto comes to a standstill. It is thus prevented that cable 18 can further unwind from the winding groove 44 and greater damage to the moderator blocks is precluded.

To insure safety of control also upon current failure or similar disturbances, a manual drive 64 is provided according to FIG. 2. The insertable bevel gear 65 supported through a biasing spring is brought into engagement with the disk wheel 66, so that drum 8 can be rotated in the desired direction.

The invention is naturally not limited to the particular structure shown in the drawing. Thus, instead of mechanical connections between cable monitor and the dependently controllable organs, electrically operative connections may be used.

Stop 56 according to FIG. 3 may, as represented symbolically, be rigid and transmit a pulse to the switching organs of the cable which drive only upon a certain cable pressure. It is, however, possible likewise to provide an elastic guide or to use electrical connections, which trigger similar pulses by fixing of the contact points.

We claim:

1. A cable drive for a control rod adapted to be lowered into the core of a nuclear reactor from the end of a supporting cable comprising a drive shaft mounting a drum on which the cable is wound, an eddy current brake comprising a stationary pole cross, a rotationally mounted pole cross and an eddy current rotor mounted therebetween, step-up gearing driven in accordance with rotation of said cable drum and having its output connected to drive said eddy current rotor, step-down gearing driven in accordance with rotation of said cable drum and having its output connected to drive a rotationally mounted cam plate, means coupling said cam plate with said rotationally mounted pole cross of said eddy current brake such that said pole cross turns to a position first producing a braking action on said eddy current rotor only when the control rod has been lowered to an intermediate point in its descent into the reactor core, a brake mechanism for said cable drum comprising a friction brake member adapted to engage said drum and a brake lever system including a pivotally mounted feeler arm coupled to said brake member, said feeler arm being actuated by said cam plate to apply the brake as the control rod nears the lowermost position within the reactor core, a pivotally mounted lever establishing an adjustable axle mounting a cable tension monitor roll whose periphery runs in contact with said cable and serves as a monitor for cable tension, and means loading said cable tension monitor roll mounting lever in such direction as would actuate said feeler arm to apply the brake in the event of a loss in tension, said cable tension monitor roll mounting lever being normally actuated in the opposite direction to a non-braking position by the normal pull on the cable exerted by the control rod.

2. A cable drive as defined in claim 1 for a control rod adapted to be lowered into the core of a nuclear reactor wherein said friction brake member for said cable drum is constituted by a brake band arranged to be brought into a gripping relationship with said cable drum, and said pivotally mounted feeler arm includes a pivot mounting at one end thereof and two points of contact thereon, one such point being engaged by a projection on said cam plate and the other point being engaged by said cable tension monitor roll mounting lever.

3. A cable drive as defined in claim 1 for a control rod adapted to be lowered into the core of a nuclear reactor wherein said means coupling said cam plate with said rotationally mounted pole cross of said eddy current motor includes cam follower means engaging a cam groove in said cam plate, a crank arm operated by said cam follower means, a gear segment operated by said crank arm and a pinion meshed with said gear segment and which serves to rotate said pole cross.

References Cited

UNITED STATES PATENTS

| 3,232,841 | 2/1966 | Fortescue et al. | 176—36 W |
| 3,279,761 | 10/1966 | Schreiber | 254—172 |
| 3,343,810 | 9/1967 | Parnell | 254—172 |

FOREIGN PATENTS

| 806,409 | 12/1958 | Great Britain | 176—36 W |
| 961,927 | 6/1964 | Great Britain | 176—36 W |
| 6,743 | 8/1964 | Japan | 176—36 W |

CARL D. QUARFORTH, Primary Examiner

E. E. LEHMANN, Assistant Examiner

U.S. Cl. X.R.

176—36 S, 36 W